US012654689B2

(12) United States Patent
Lee et al.

(10) Patent No.: US 12,654,689 B2
(45) Date of Patent: Jun. 16, 2026

(54) APPARATUS AND METHOD FOR CONTROLLING AUTOMATIC PARKING

(71) Applicants:Hyundai Motor Company, Seoul (KR); Kia Corporation, Seoul (KR)

(72) Inventors: Ki Ho Lee, Yongin-Si (KR); Kyung Soo Ha, Hwaseong-Si (KR); In Mook Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 48 days.

(21) Appl. No.: 18/938,424

(22) Filed: Nov. 6, 2024

(65) Prior Publication Data

US 2025/0269842 A1     Aug. 28, 2025

(30) Foreign Application Priority Data

Feb. 27, 2024     (KR) ........................ 10-2024-0027849

(51) Int. Cl.
| | |
|---|---|
| *B60W 30/06* | (2006.01) |
| *G06V 20/56* | (2022.01) |
| *G06V 20/58* | (2022.01) |

(52) U.S. Cl.
CPC .......... *B60W 30/06* (2013.01); *G06V 20/586* (2022.01); *G06V 20/588* (2022.01); *B60W 2420/403* (2013.01); *B60W 2552/53* (2020.02)

(58) Field of Classification Search
CPC ........... B60W 30/06; B60W 2420/403; B60W 2552/53; G06V 20/586; G06V 20/588
See application file for complete search history.

(56) References Cited

U.S. PATENT DOCUMENTS

| | | | | |
|---|---|---|---|---|
| 11,654,895 B2 * | 5/2023 | Lee | ........................... | G06T 7/74 |
| | | | | 340/932.2 |
| 2018/0099661 A1 * | 4/2018 | Bae | ....................... | B60W 30/06 |
| 2019/0193724 A1 * | 6/2019 | Kim | ....................... | G06V 20/54 |
| 2021/0086757 A1 * | 3/2021 | Sugano | ................ | B60W 30/06 |

* cited by examiner

*Primary Examiner* — Richard M Camby
(74) *Attorney, Agent, or Firm* — Banner & Witcoff, Ltd.

(57) ABSTRACT

The present disclosure provides an apparatus and method for controlling automatic parking. A method may include obtaining parking line recognition information from a captured image of a target parking slot, determining angular relationships between a plurality of parking lines of the target parking slot based on the parking line recognition information, estimating a gradient of the target parking slot based on the angular relationships, and controlling longitudinal driving of a vehicle based on the estimated gradient.

20 Claims, 7 Drawing Sheets

APPARATUS AND METHOD FOR CONTROLLING AUTOMATIC PARKING

CROSS-REFERENCE TO RELATED APPLICATIONS

This application is based on, and claims priority from, Korean Patent Application Number 10-2024-0027849, filed Feb. 27, 2024, the disclosure of which is incorporated herein by reference in its entirety.

TECHNICAL FIELD

The present disclosure relates to a device and a method for controlling automatic parking. More specifically, the present disclosure relates to technology for controlling automatic parking based on the gradient of a parking space.

BACKGROUND

The content described below simply provides background information related to the present embodiment and does not constitute prior art.

An autonomous vehicle (AV) is a vehicle that can travel by itself by recognizing a driving environment, determining risks, and planning a driving route with little or no driver intervention. The levels of automation of such autonomous vehicles may be divided into six categories from level 0 to level 5 according to the guideline J3016 presented by the Society of Automotive Engineers (SAE). Autonomous vehicles may be able to perform automatic parking along a memorized driving route or a designated route within a parking lot.

Parking convenience functions for assisting with parking or exiting a vehicle may be applied to vehicles. For example, Remote Smart Parking Assist (RSPA) may enable a vehicle to recognize obstacles and parking lines around the vehicle, search for a parking space, and/or automatically control steering, acceleration/deceleration, shifting, and braking of the vehicle. Smart parking/exiting functions may be provided when the driver is on board, and remote parking and remote forward/reverse functions may be provided when the driver has been alighted. RSPA can perform not only perpendicular parking, parallel parking, or diagonal parking but also parking and exiting in narrow spaces.

RSPA may control vehicle's movement under limited vehicle speeds due to parking environments being crowded with other vehicles and obstacles, limitations in the recognition range and performance of ultrasonic sensors, uncertainty in image recognition, and the like.

RSPA may use a driving torque exceeding a creep torque to maintain a vehicle speed in inclined parking environments. Due to this high driving torque, a high braking pressure may be required for RSPA to control a vehicle speed below the creep speed. In addition, due to the nature of parking, the gradient of braking pressure reduction upon re-starting may need to be gradual whenever a change in forward/backward direction is necessary, which may increase parking control time. This phenomenon is especially noticeable in internal combustion engine vehicles and large vehicles with higher engine displacement.

SUMMARY

The embodiments of the present disclosure provide a device and method for estimating the gradient of a parking space based on parking line recognition information and performing automatic parking control according to the gradient.

The purposes to be achieved by the present disclosure are not limited to the object mentioned above, and other purposes that are not mentioned can be clearly understood by those skilled in the art from the description below.

According to one or more example embodiments, a method may be performed by a vehicle. The method may include: obtaining, from a captured image of a target parking slot, parking line recognition information; determining, based on the parking line recognition information, angular relationships between a plurality of parking lines of the target parking slot; estimating, based on the angular relationships, a gradient of the target parking slot; and controlling, based on the estimated gradient, longitudinal driving of the vehicle.

Obtaining the parking line recognition information may include: controlling the vehicle to stop at a predetermined location; receiving the captured image of the target parking slot; and obtaining, based on the captured image, the parking line recognition information, wherein the parking line recognition information indicates at least: at least one entrance point of the target parking slot, and the plurality of parking lines of the target parking slot.

Determining the angular relationships between the plurality of parking lines of the target parking slot comprises: obtaining a first angle, relative to an entry line connecting two entrance points of the target parking slot, of a first parking line of the plurality of parking lines; obtaining a second angle, relative to the entry line, of a second parking line of the plurality of parking lines; determining an average angle of the first angle and the second angle; determining, based on the first angle and the second angle, an internal angle sum; and determining, based on the average angle, a reference internal angle sum.

Determining the angular relationships may include determining whether a difference between the reference internal angle sum and 180° is less than a threshold value.

Estimating the gradient of the target parking slot comprises determining, based on the internal angle sum being greater than the reference internal angle sum and an absolute value of a difference between the internal angle sum and the reference internal angle sum being greater than or equal to a predetermined threshold value, that the target parking slot has a positive gradient.

Estimating the gradient of the target parking slot comprises determining, based on the internal angle sum being less than the reference internal angle sum and an absolute value of a difference between the internal angle sum and the reference internal angle sum being greater than or equal to a predetermined threshold value, that the target parking slot has a negative gradient.

Estimating the gradient of the target parking slot comprises comparing a difference, between the internal angle sum and the reference internal angle sum, to a lookup table.

Controlling the longitudinal driving of the vehicle comprises: while controlling autonomous driving of the vehicle, increasing, based on the gradient of the target parking slot being positive, a target driving torque of the vehicle.

Controlling the longitudinal driving of the vehicle may include: while controlling autonomous driving of the vehicle, decreasing, based on the gradient of the target parking slot being negative, a target driving torque of the vehicle.

Controlling the longitudinal driving of the vehicle may include: while controlling autonomous driving of the vehicle, increasing, based on the gradient of the target parking slot being positive, a target braking pressure of the vehicle compared to when the gradient of the target parking slot is neutral.

According to one or more example embodiments, a device may include: at least one processor; and a memory operatively coupled to the at least one processor. The memory may store instructions that, when executed by the at least one processor, cause the device to: obtain, from a captured image of a target parking slot, parking line recognition information; determine, based on the parking line recognition information, angular relationships between a plurality of parking lines of the target parking slot; estimate, based on the angular relationships, a gradient of the target parking slot; and control, based on the estimated gradient, longitudinal driving of a vehicle.

The instructions, when executed by the at least one processor, may cause the device to obtain the parking line recognition information by: controlling the vehicle to stop at a predetermined location; receiving the captured image of the target parking slot; and obtaining, based on the captured image, the parking line recognition information, wherein the parking line recognition information indicates at least: at least one entrance point of the target parking slot, and the plurality of parking lines of the target parking slot.

The instructions, when executed by the at least one processor, may cause the device to determine the angular relationships by: obtaining a first angle, relative to an entry line connecting two entrance points of the target parking slot, of a first parking line of the plurality of parking lines; obtaining a second angle, relative to the entry line, of a second parking line of the plurality of parking lines; determining an average angle of the first angle and the second angle; determining, based on the first angle and the second angle, an internal angle sum; and determining, based on the average angle, a reference internal angle sum.

The instructions, when executed by the at least one processor, may cause the device to determine the angular relationships by: determining whether a difference between the reference internal angle sum and 180° is less than a threshold value.

The instructions, when executed by the at least one processor, may cause the device to estimate the gradient of the target parking slot by: determining, based on the internal angle sum being greater than the reference internal angle sum and an absolute value of a difference between the internal angle sum and the reference internal angle sum being greater than or equal to a predetermined threshold value, that the target parking slot has a positive gradient.

The instructions, when executed by the at least one processor, may cause the device to estimate the gradient of the target parking slot by: determining, based on the internal angle sum being less than the reference internal angle sum and an absolute value of a difference between the internal angle sum and the reference internal angle sum being greater than or equal to a predetermined threshold value, that the target parking slot has a negative gradient.

The instructions, when executed by the at least one processor, may cause the device to estimate the gradient of the target parking slot by: comparing a difference, between the internal angle sum and the reference internal angle sum, to a lookup table.

The instructions, when executed by the at least one processor, may cause the device to control the longitudinal driving of the vehicle by: while controlling autonomous driving of the vehicle, increasing, based on the gradient of the target parking slot being positive, a target driving torque of the vehicle.

The instructions, when executed by the at least one processor, may cause the device to control the longitudinal driving of the vehicle by: while controlling autonomous driving of the vehicle, decreasing, based on the gradient of the target parking slot being negative, a target driving torque of the vehicle.

The instructions, when executed by the at least one processor, may cause the device to control the longitudinal driving of the vehicle by: while controlling autonomous driving of the vehicle, increasing, based on the gradient of the target parking slot being positive, a target braking pressure of the vehicle compared to when the gradient of the target parking slot is neutral.

The effects of the present disclosure are not limited to the effects mentioned above, and other effects not mentioned will be clearly understood by those skilled in the art from the description below.

DETAILED DESCRIPTION

Figure 1:
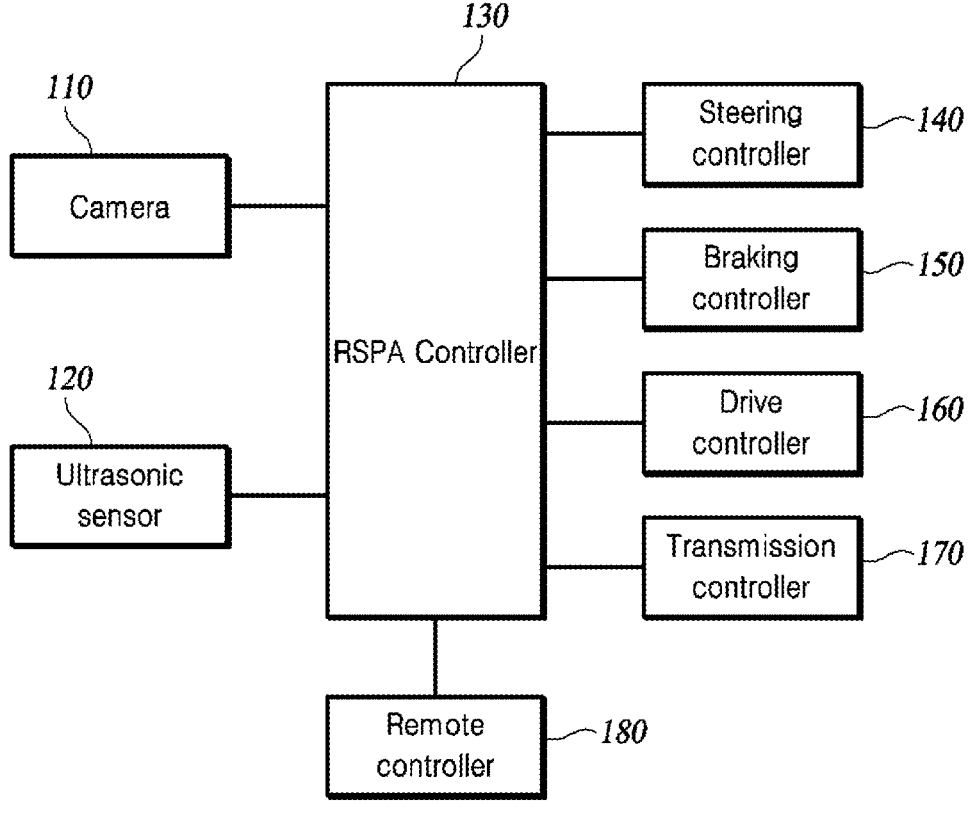
FIG. 1 is a configuration diagram of an RSPA system to which an embodiment of the present disclosure is applied.

Hereinafter, some embodiments of the present disclosure will be described in detail with reference to the accompanying drawings. In the following description, like reference numerals preferably designate like elements, although the elements are shown in different drawings. Further, for the purpose of clarity and for brevity, the following description of some embodiments will omit a detailed description of related known components and functions when considered obscuring the subject of the present disclosure.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, to not exclude thereof unless specifically stated to the contrary. The terms such as "unit," "module," and the like refer to units in which at least one function or operation is processed and they may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

An autonomous vehicle (AV) is a vehicle that can travel by itself by recognizing a driving environment, determining risks, and planning a driving route with little or no driver intervention. The levels of automation of such autonomous vehicles may be divided into six categories from level 0 to level 5 according to the guideline J3016 presented by the Society of Automotive Engineers (SAE). Autonomous vehicles may be able to perform automatic parking along a memorized driving route or a designated route within a parking lot.

The present disclosure relates to technology for improving the performance of a parking assistance system or automatic parking system by estimating the gradient of a parking space based on parking line recognition information and performing automatic parking control according to the gradient. Here, the parking assistance system or automatic parking system may include a remote smart parking assist (RSPA) system, a remote parking pilot (RPP) system, and the like. In this specification, application to the RSPA system is described as an example, but is not limited thereto.

FIG. 1 is a configuration diagram of an RSPA system to which an embodiment of the present disclosure is applied.

Referring to FIG. 1, the RSPA system to which the embodiment of the present disclosure is applied includes a camera 110, an ultrasonic sensor 120, an RSPA controller 130, a steering controller 140, a braking controller 150, a drive controller 160, a transmission controller 170, and a remote controller 180. Depending on how the embodiments of the present disclosure are implemented, the components may be combined and provided as one component, and some components may be omitted depending on how the present disclosure is implemented.

Components of the RSPA system can transmit/receive signals or data to/from each other using various communication protocols provided in the vehicle. Here, the communication protocols may include at least one of a controller area network (CAN), CAN with flexible data-rate (CAN FD), a local interconnect network (LIN), FlexRay, or the Ethernet.

The camera 110 acquires captured images around the vehicle. The captured images are provided to the RSPA controller 130. A plurality of cameras 110 may be disposed on the front/rear/sides of the vehicle, but the present disclosure is not limited thereto. The camera 100 may include a fisheye camera, a wide-angle camera, and the like.

The ultrasonic sensor 120 can detect objects around the vehicle and measure the directions and distances of the objects. A plurality of ultrasonic sensors 120 may be disposed on the front/rear/sides of the vehicle.

The RSPA system can obtain driving information from vehicle sensors (not shown). Here, the driving information may include at least one of the speed, acceleration, angular velocity, yaw rate, or steering angle of the vehicle. The vehicle sensors may include a speed sensor, an acceleration sensor, a gyro sensor, a yaw rate sensor, a steering angle sensor, and the like.

The RSPA controller 130 controls overall operations to perform functions provided by the RSPA system.

The RSPA controller 130 recognizes obstacles and parking lines around the vehicle using the camera 110 and the ultrasonic sensor 120 to search for a parking space and automatically assists in steering, acceleration, deceleration, and gear shifting. Additionally, the RSPA controller 130 automatically assists with braking upon detecting an obstacle on a parking route.

When a target parking slot is determined, the RSPA controller 130 generates a parking route and controls automatic parking of the vehicle to follow the generated parking route. The RSPA controller 130 may perform vehicle control on the basis of surrounding environment information obtained from the camera 110 and the ultrasonic sensor 120 and driving information obtained from vehicle sensors.

The steering controller 140 is for controlling steering, and may be implemented as motor drive power steering (MDPS) or the like. The steering controller 140 can control the steering angle of the vehicle according to a steering signal through a steering wheel or a control signal of the RSPA controller 130.

The braking controller 150 is for controlling a braking force and may be implemented as electronic stability control (ESC) or the like. The braking controller 150 can control the brake pressure according to the brake pedal position information or a control signal of the RSPA controller 130.

The drive controller 160 is for controlling a driving force and controls acceleration and deceleration of the vehicle. The drive controller 160 may be implemented as an engine management system (EMS) or the like. The drive controller 160 can control the driving torque of the engine according to accelerator pedal position information. Additionally, the drive controller 160 can control engine output to follow a target driving torque requested by the RSPA controller 130.

The transmission controller 170 is responsible for shifting the gears (shift stages) of the vehicle. The transmission controller 170 may be implemented as an electronic shifter or a shift by wire (SBW).

The remote controller 180 transmits a remote automatic parking control command from a user to the RSPA controller 130. Here, the user refers to a person who possesses the remote controller 180 and is authorized to remotely control automatic parking of the vehicle. After alighting from the vehicle, the user can perform remote parking, remote forward/reverse movement, and the like through the remote controller 180.

The remote controller 180 may include smart keys and all portable mobile devices such as smart phones, tablet computers, netbook computers, and personal digital assistants (PDAs).

The RSPA system may further include an input unit (not shown) and an output unit (not shown).

The input unit receives data input by the user. For example, the input unit may receive information for setting a target parking slot or selecting one of perpendicular parking, parallel parking, and diagonal parking from the user. The input unit may include a keypad, a dome switch, a touch pad, a voice recognizer, a jog wheel, and/or a jog switch.

The output unit outputs visual information, auditory information, and/or tactile information, and may include a display, an audio output module, a haptic module, and the like. For example, the output unit may display a parking route overlaid on a precise map or output information on an automatic parking status, warning/notification messages, and the like.

Figure 2:
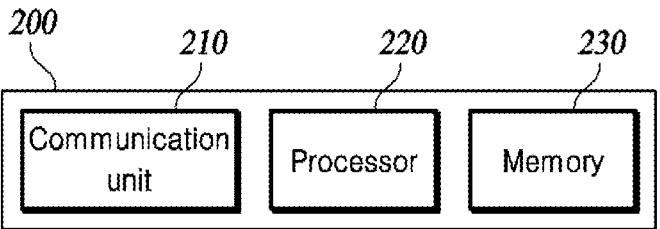
FIG. 2 is a block diagram of an automatic parking control device according to an embodiment of the present disclosure.

FIG. 2 is a block diagram of an automatic parking control device according to an embodiment of the present disclosure. In order to improve the performance of the parking assistance system or automatic parking system, the automatic parking control device 200 estimates the gradient of a parking space on the basis of parking line recognition information and performs automatic parking control according to the gradient. For example, the automatic parking control device 200 may be implemented integrally with the RSPA controller 130, or may be implemented as a separate device and connected to the RSPA controller 130 through a connection means.

Referring to FIG. 2, the automatic parking control device 200 according to an embodiment of the present disclosure includes a communication unit 210, a processor 220, and a memory 230. The automatic parking control device 200 may be mounted inside a vehicle.

The communication unit 210 can transmit/receive signals or data to/from other components except the remote controller 180 of the RSPA system using various communication protocols provided in the vehicle. For example, the communication unit 210 may receive images or obstacle detection information around the vehicle from the camera 110 and the ultrasonic sensor 120. For example, the communication unit 210 may receive driving information including the speed, acceleration, angular velocity, yaw rate, and steering angle of the vehicle from vehicle sensors. For example, the communication unit 210 may transmit a control signal for steering, braking, driving, or shifting to the corresponding controller.

The communication unit 210 can transmit/receive signals or data to/from the remote controller 180 using various wireless communication methods. Here, wireless communication methods may include a wireless LAN (WLAN), Wireless-Fidelity (Wi-Fi), Wi-Fi Direct, Digital Living Network Alliance (DLNA), wireless broadband (WiBro), world interoperability for microwave access (WiMAX), high speed downlink packet access (HSDPA), high speed uplink packet access (HSUPA), Long Term Evolution (LTE), 5G New Radio (NR), Bluetooth Low Energy (BLE), near field communication (NFC) ultra wideband (UWB) communication, etc. For example, the communication unit 210 may receive a remote automatic parking control command from the remote controller 180 and transmit the result of execution of the command to the remote controller 180.

The processor 220 performs overall control such that the automatic parking control device 200 can perform the functions thereof normally. The processor 220 may be implemented in hardware, software, or a combination of hardware and software. The processor 220 may perform various data processing and calculations using information stored in the memory 230. The processor 220 may be configured to execute a series of instructions stored in memory 230.

The processor 220 searches for at least one empty parking space on the basis of information (e.g., directions, distances, and the like) on obstacles detected through the ultrasonic sensor 120 and object information (e.g., parking lines, other vehicles, pedestrians and the like) recognized from images acquired through the camera 110.

The processor 220 sets one of at least one searched parking space selected by the user or determined by a predetermined criterion as a target parking slot.

The processor 220 generates a parking route on the basis of the current location of the vehicle and the target parking slot.

The processor 220 controls automatic parking of the vehicle such that the vehicle follows the generated parking route. At this time, the processor 220 may estimate the gradient of the parking space using parking line recognition information and perform automatic parking control according to the gradient. This is for the purpose of performing longitudinal driving and braking control of the vehicle according to the gradient of the parking space to improve the performance of the parking assistance system or automatic parking system.

After the target parking slot is set, the processor 220 estimates the gradient of the parking space by analyzing parking line information recognized from the images. The process through which the processor 220 estimates the gradient of the parking space will be described with reference to FIGS. 3A to 4C.

First, the processor 220 controls the vehicle such that the vehicle stops at a predetermined location in order to estimate the gradient. This is for the purpose of ensuring the accuracy of estimation of the gradient of the parking space using the parking line recognition information. For example, as shown in FIGS. 3 and 4, the vehicle can be controlled to move and stop such that the camera 110 is located on an extension of the center line of a pair of side parking lines of the target parking slot 300 and 400.

The processor 220 receives a captured image of the target parking slot and obtains parking line recognition information from the image. Here, the parking line recognition information includes at least one piece of entrance point information of the target parking slot, at least one piece of parking line information of the target parking slot, and the like.

The processor 220 analyzes the parking line recognition information. This is for the purpose of extracting data for estimating the gradient of the parking space from the parking line recognition information (e.g., angular relationships between parking lines), in consideration of the fact that the parking lines appear distorted in the image depending on the gradient of the parking space.

First, the processor 220 may determine angular relationships between parking lines. For example, the processor 220 obtains a first angle of a recognized first parking line (301, 401) and a second angle of a recognized second parking line (302, 402) on the basis of (e.g., relative to) an entry line (303, 403) connecting two entrance points of the target parking slot (300, 400). At this time, the clockwise direction can be set to (−) and the counterclockwise direction can be set to (+).

Secondly, the processor 220 calculates the average angle (e.g., an average value) of the first angle and the second angle.

Thirdly, the processor 220 may determine further angular relationships between parking lines. For example, the processor 220 calculates the recognized internal angle sum (e.g., a sum of two adjacent interior angles) using the first angle and the second angle. Here, the recognized internal angle sum (e.g., a sum of two adjacent interior angles) is the sum of the first internal angle (e.g., interior angle) formed by the entry line (303, 403) and the recognized first parking line (301, 401) and the second internal angle (e.g., interior angle) formed by the entry line (303, 403) and the recognized second parking line (302, 402).

Fourthly, the processor 220 may determine further angular relationships between parking lines. For example, the processor 220 calculates a reference internal angle sum using the average angle. Here, the reference internal angle sum is calculated on the assumption that each of the first and second parking lines has the average angle with respect to the entry line.

Figure 3A:
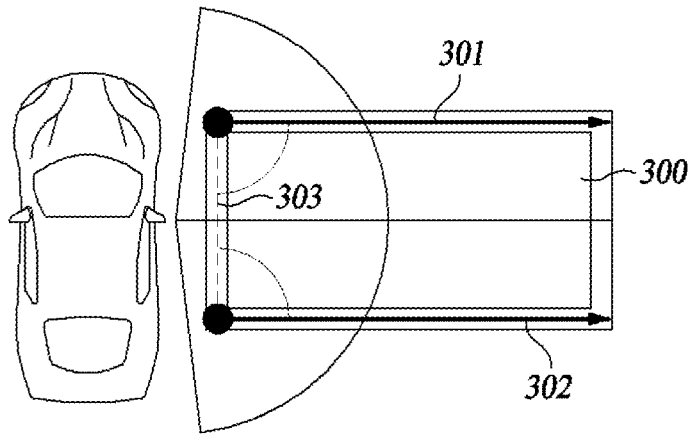
FIGS. 3A, 3B, and 3C are diagrams illustrating parking line recognition information of a parking slot for perpendicular parking or parallel parking and a process of analyzing the same.

Referring to FIG. 3A, if a parking slot for perpendicular parking or parallel parking is flat, the first angle may be, for example, −90°, the second angle may be, for example, −90°, the average angle is calculated as −90°, the recognized internal angle sum (e.g., a sum of two adjacent interior angles) is calculated as 180°, and the reference internal angle sum is calculated as 180°.

Figure 3B:
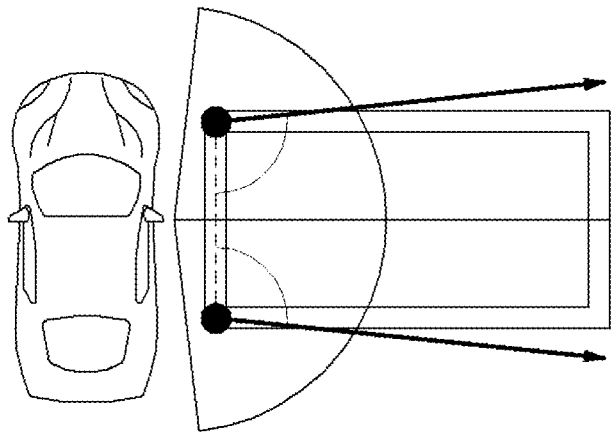

Referring to FIG. 3B, if a parking slot for perpendicular parking or parallel parking is sloping uphill (upslope or having a positive gradient), the first angle may be, for example, −80°, the second angle may be, for example, −100°, the average angle may be calculated as −90°, the recognized internal angle sum (e.g., a sum of two adjacent interior angles) may be calculated as 200°, and the reference internal angle sum may be calculated as −180°.

Figure 3C:
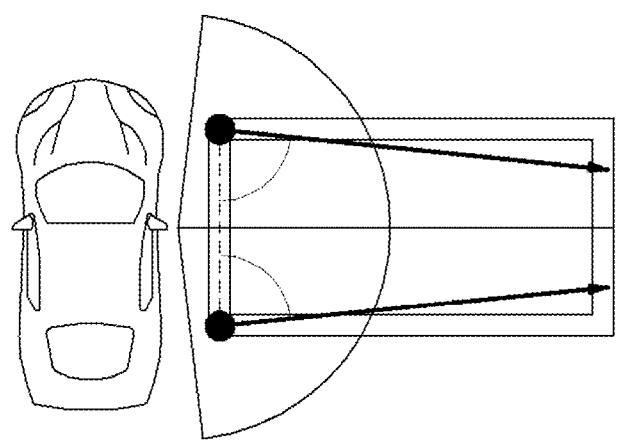

Referring to FIG. 3C, when a parking slot for perpendicular parking or parallel parking is sloping downhill (downslope), the first angle may be, for example, −100°, the second angle may be, for example, −80°, the average angle may be calculated as −90°, the recognized internal angle sum (e.g., a sum of two adjacent interior angles) may be calculated as 160°, and the reference internal angle sum may be calculated as 180°.

Figure 4A:
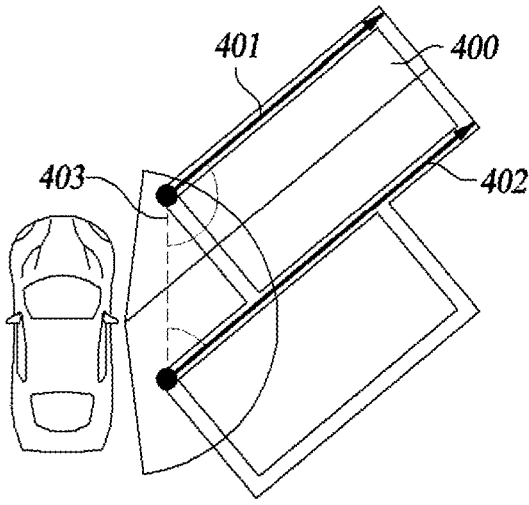
FIGS. 4A, 4B, and 4C are diagrams illustrating parking line recognition information of a parking slot for diagonal parking and a process of analyzing the same.

Referring to FIG. 4A, when a parking slot for diagonal parking is flat, the first angle may be, for example, −45°, the second angle may be, for example, −45°, the average angle may be calculated as −45°, the recognized internal angle sum (e.g., a sum of two adjacent interior angles) may be calculated as 180°, and the reference internal angle sum may be calculated as 180°.

Figure 4B:
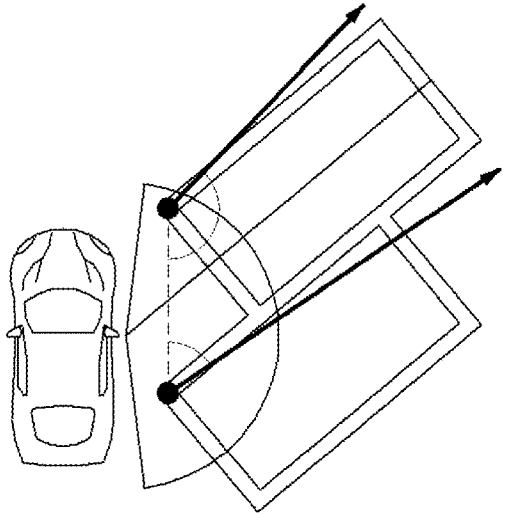

Referring to FIG. 4B, when a parking slot for diagonal parking is sloping uphill (upslope or having a positive gradient), the first angle may be, for example, −40°, the second angle may be, for example, −50°, the average angle may be calculated as −45°, the recognized internal angle sum (e.g., a sum of two adjacent interior angles) may be calculated as 190°, and the reference internal angle sum may be calculated as 180°.

Figure 4C:
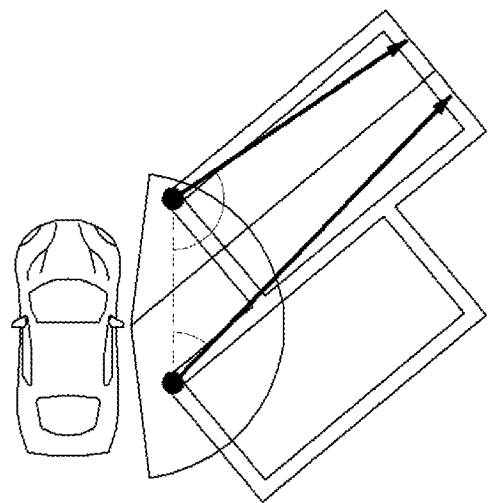

Referring to FIG. 4C, when a parking slot for diagonal parking is sloping downhill (downslope or having a negative gradient), the first angle may be, for example, −50°, the second angle may be, for example, −40°, the average angle may be calculated as −45°, the recognized internal angle sum (e.g., a sum of two adjacent interior angles) may be calculated as 170°, and the reference internal angle sum may be calculated as 180°.

The processor 220 determines whether to use the parking line recognition information in order to determine whether the parking line recognition information is suitable for use in gradient estimation. The processor 220 may determine whether to use the parking line recognition information using the reference internal angle sum. For example, if the reference internal angle sum is within a predetermined tolerance range based on 180° (e.g., within a threshold value away from 180°, or in other words, 180°±t°), the parking line recognition information may be determined to be suitable for use in gradient estimation, and thus gradient estimation and automatic parking control according to the gradient can be performed. For example, if the reference internal angle sum is outside the predetermined tolerance range based on 180° (e.g., within a threshold value away from 180°, or in other words, 180°±t°), it may be determined that the parking line recognition information is not suitable for use in gradient estimation, and conventional automatic parking control can be performed. Conventional automatic parking control refers to automatic parking control that is performed based on flat ground without considering the gradient of a parking space.

The processor 220 may estimate the gradient of the parking space based on angular relationships between the parking lines of the target parking slot. For example, the processor 220 may estimate the gradient of the parking space using the recognized internal angle sum (e.g., a sum of two adjacent interior angles) and the reference internal angle sum.

The processor 220 may determine whether the parking space is flat (e.g., having a neutral gradient), uphill (e.g., having a positive gradient), or downhill (e.g., having a negative gradient), for example, based on angular relationships between parking lines. For example, the processor 220 may determine that the parking space is sloping uphill if the recognized internal angle sum is greater than the reference internal angle sum and the absolute value of the difference between the recognized internal angle sum and the reference internal angle sum is equal to or greater than a predetermined threshold value. For example, the processor 220 may determine that the parking space is sloping downhill if the recognized internal angle sum is less than the reference internal angle sum and the absolute value of the difference between the recognized internal angle sum and the reference internal angle sum is equal to or greater than the predetermined threshold value. For example, if the above-mentioned conditions are not met, the processor 220 may determine that the parking space is flat.

The processor 220 may estimate the gradient of the parking space. For example, the processor 220 may estimate a gradient by looking up the difference between the recognized internal angle sum and the reference internal angle sum in a lookup table (e.g., comparing the difference to the lookup table). Here, the lookup table refers to data constructed by previously measuring the actual gradient corresponding to the difference between the recognized internal angle sum and the reference internal angle sum.

Upon determining that the parking space is sloping uphill or downhill, the processor 220 performs longitudinal control of the vehicle according to the gradient of the parking space. The processor 220 may perform longitudinal driving and/or braking control of the vehicle according to the gradient of the parking space.

Longitudinal driving and/or braking control of the vehicle performed by the processor 220 when the parking space is sloping uphill (upslope) will be described.

The processor 220 determines whether the vehicle enters a slope during automatic parking control. For example, the processor 220 may determine whether the vehicle enters a slope by comparing a slope start position (e.g., the position of the entry line determined based on the parking line recognition information) and the current location of the vehicle. For example, the processor 220 may determine whether the vehicle enters a slope by additionally considering a longitudinal acceleration and/or speed information of the vehicle detected through vehicle sensors.

The processor 220 performs longitudinal driving and/or braking control of the vehicle according to the upslope.

For example, the processor 220 may request the drive controller 160 to output an increased target driving torque according to the estimated gradient at the slope start position. Here, the target driving torque is a driving torque set for automatic parking based on the case where the parking space is flat. The processor 220 may increase or decrease the target driving torque according to the difference between a target vehicle speed and an estimated vehicle speed.

For example, the processor 220 may perform braking control to stop in response to detection of an obstacle. The processor 220 may request the braking controller 150 to output the same target braking pressure as those when the parking space is flat (e.g., having a neutral gradient). Here, the target braking pressure is a braking pressure set to stop the vehicle based on the case where the parking space is flat. The processor 220 may request the braking controller 150 to output a reduced target braking pressure compared to those when the parking space is flat for riding comfort when there are occupants within the vehicle.

For example, the processor 220 may control the vehicle speed as in the case where the parking space is flat as the target driving torque increases according to the estimated gradient.

Longitudinal driving and/or braking control of the vehicle performed by the processor 220 when the parking space is sloping downhill (downslope) will be described.

The processor 220 determines whether the vehicle enters a slope during automatic parking control. For example, the processor 220 may determine whether the vehicle enters a slope by comparing a slope start position (e.g., the position of the entry line determined based on the parking line recognition information) and the current location of the vehicle. For example, the processor 220 may determine whether the vehicle enters a slope by additionally considering a longitudinal acceleration and/or speed information of the vehicle detected through vehicle sensors.

The processor 220 performs longitudinal driving and/or braking control of the vehicle according to a downslope.

For example, the processor 220 may request the drive controller 160 to output a reduced target driving torque according to the estimated gradient at the slope start position. The processor 220 may set the target driving torque to a minimum level at which the creep torque is maintained. In the case of an electric vehicle, the processor 220 may utilize regenerative braking.

For example, the processor 220 may perform braking control to stop in response to detection of an obstacle. The processor 220 may request the braking controller 150 to output an increased target braking pressure compared to those when the parking space is flat.

For example, the processor 220 maintains the driving torque to a minimum on the downslope, but may increase the target braking pressure for vehicle speed control as the vehicle descends on the downslope.

Figure 5:
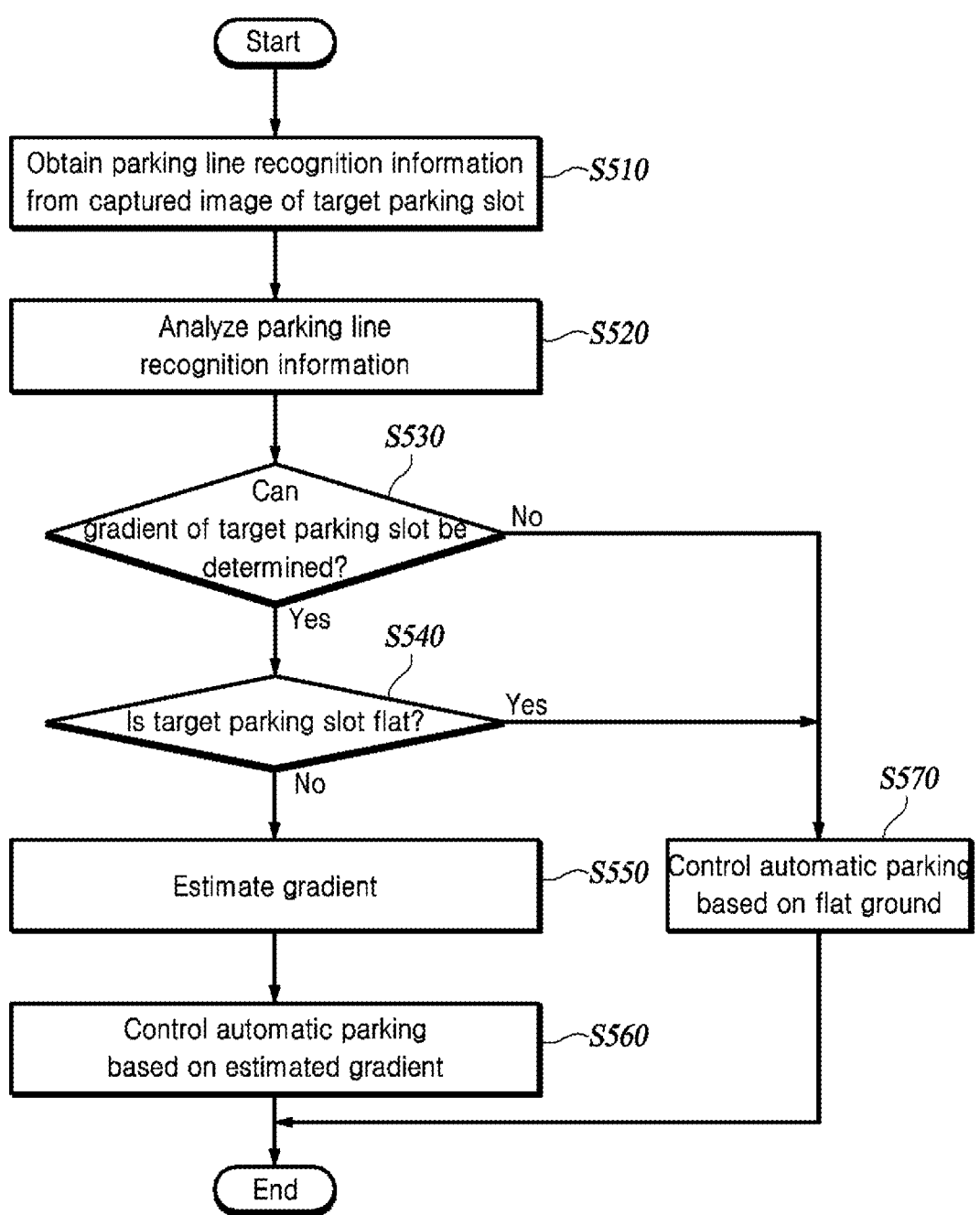
FIG. 5 is a flowchart of a method of performing automatic parking control using a gradient according to an embodiment of the present disclosure.

FIG. 5 is a flowchart of a method of performing automatic parking control using a gradient according to an embodiment of the present disclosure.

Referring to FIG. 5, first, the automatic parking control device 200 controls the vehicle such that the vehicles stops at a predetermined location for gradient estimation. This is for the purpose of ensuring the accuracy of estimation of the gradient of a parking space using parking line recognition information. For example, the vehicle can be controlled to move and stop such that the camera 110 is located on an extension of the center line of a pair of side parking lines of the target parking slot 300 and 400.

The automatic parking control device 200 receives a captured image of the target parking slot from the camera 110 and obtains parking line recognition information from the image (S510). Here, the parking line recognition information includes at least one piece of entrance point information, at least one piece of parking line information of the target parking slot, and the like.

The automatic parking control device 200 analyzes the parking line recognition information (S520). This is for the purpose of extracting data for estimating the gradient of the parking space from the parking line recognition information. The automatic parking control device 200 analyzes the parking line recognition information to extract data such as a recognized internal angle sum and a reference internal angle sum.

The automatic parking control device 200 determines whether to use the parking line recognition information (S530). This is for the purpose of determining whether the parking line recognition information is suitable for use in gradient estimation for safety. The automatic parking control device 200 may determine whether to use the parking line recognition information using the reference internal angle sum. For example, if the reference internal angle sum is within a predetermined tolerance range based on 180° (e.g., within a threshold value away from 180°, or in other words, 180°±t°), the parking line recognition information is determined to be suitable for use in gradient estimation, and thus gradient estimation and automatic parking control according to the gradient can be performed. For example, if the reference internal angle sum is outside the predetermined tolerance range based on 180° (e.g., within a threshold value away from 180°, or in other words, 180°±t°), it is determined that the parking line recognition information is not suitable for use in gradient estimation, and conventional automatic parking control can be performed. Conventional automatic parking control refers to automatic parking control that is performed based on flat ground without considering the gradient of a parking space.

Upon determining that the parking line recognition information is not suitable for use in gradient estimation, the process proceeds to S570 and the automatic parking control device 200 performs conventional automatic parking control based on flat ground.

Upon determining that the parking line recognition information is suitable for use in gradient estimation, the automatic parking control device 200 determines whether the target parking slot is flat, uphill, or downhill (S540). For example, the automatic parking control device 200 determines that the parking space is sloping uphill (e.g., having a positive gradient) when the recognized internal angle sum is greater than the reference internal angle sum and the absolute value of the difference between the recognized internal angle sum and the reference internal angle sum is equal to or greater than a predetermined threshold value. For example, the automatic parking control device 200 determines that the parking space is sloping downhill when the recognized internal angle sum is less than the reference internal angle sum and the absolute value of the difference between the recognized internal angle sum and the reference internal angle sum is equal to or greater than the predetermined threshold value. For example, the automatic parking control device 200 may determine that the parking space is flat if the above-mentioned conditions are not met.

Upon determining that the target parking slot is flat, the process proceeds to S570 and the automatic parking control device 200 performs conventional automatic parking control based on flat ground.

Upon determining that the target parking slot is sloping uphill or downhill, the automatic parking control device 200 estimates the gradient of the target parking slot (S550). For example, the automatic parking control device 200 may estimate a gradient by looking up the difference between the recognized internal angle sum and the reference internal angle sum in a lookup table. Here, the lookup table refers to data constructed by previously measuring the actual gradient corresponding to the difference between the recognized internal angle sum and the reference internal angle sum.

The automatic parking control device 200 performs longitudinal control of the vehicle according to the estimated gradient (S560). The automatic parking control device 200 can perform longitudinal driving and/or braking control of the vehicle according to the gradient.

For example, if the target parking slot is sloping uphill, the automatic parking control device 200 may determine whether the vehicle enters a slope and request the drive controller 160 to output an increased target driving torque according to the estimated gradient at the gradient start position.

For example, if the target parking slot is sloping downhill, the automatic parking control device 200 may determine whether the vehicle enters a slope and request the drive controller 160 to output a reduced target driving torque according to the estimated gradient at the gradient start position. The automatic parking control device 200 may set the target driving torque to a minimum level at which a creep torque is maintained. The automatic parking control device 200 may perform braking control to stop in response to detection of an obstacle, and request the braking controller 150 to output an increased target braking pressure compared to those when the target parking slot is flat.

According to at least one embodiment, the present disclosure provides a method of performing automatic parking control using a gradient including obtaining parking line recognition information from a captured image of a target parking slot, calculating data by analyzing the parking line recognition information, determining whether parking lines have been recognized normally on the basis of the calculated data, estimating a gradient of the target parking slot on the basis of the calculated data upon determining that the parking lines have been recognized normally, and controlling longitudinal driving of a vehicle according to the estimated gradient.

According to another embodiment, the present disclosure provides a device comprising at least one processor and a memory operatively coupled to the at least one processor, wherein the memory stores instructions that cause the at least one processor to perform operations in response to an execution of the instructions by the at least one processor, and wherein the operations including obtaining parking line recognition information from a captured image of a target parking slot, calculating data by analyzing the parking line recognition information, determining whether parking lines have been recognized normally on the basis of the calculated data, estimating a gradient of the target parking slot on the basis of the calculated data upon determining that the parking lines have been recognized normally, and controlling longitudinal driving of a vehicle according to the estimated gradient.

According to embodiments of the present disclosure, it is possible to reduce a parking time and improve the performance of the RSPA system by performing automatic parking control based on a gradient.

The apparatus or method according to the present disclosure may have the respective components arranged to be implemented as hardware or software, or hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as read-only memory (ROM), compact disc ROM (CD-ROM), magnetic tape, floppy disk, memory card, hard disk, optical/magnetic disk, storage devices, and the like. The computer-readable recording mediums may further include transitory media such as a data transmission medium. Further, the computer-readable recording medium can be distributed in computer systems connected via a network, wherein the computer-readable codes can be stored and executed in a distributed mode.

Although the steps in the respective flowcharts are described to be sequentially performed, they merely instantiate the technical idea of some embodiments of the present disclosure. Therefore, a person having ordinary skill in the pertinent art could perform the steps by changing the sequences described in the respective flowcharts or by performing two or more of the steps in parallel, and hence the steps in the respective flowcharts are not limited to the illustrated chronological sequences.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the embodiments of the present disclosure is not limited by the illustrations. Accordingly, one of ordinary skill would understand that the scope of the present disclosure is not to be limited by the above explicitly described example embodiments but by the claims and equivalents thereof.

What is claimed is:

1. A method performed by a vehicle, the method comprising:
   obtaining, from a captured image of a target parking slot, parking line recognition information;
   determining, based on the parking line recognition information, angular relationships between a plurality of parking lines of the target parking slot;
   estimating, based on the angular relationships, a gradient of the target parking slot; and
   controlling, based on the estimated gradient, longitudinal driving of the vehicle.

2. The method of claim 1, wherein the obtaining of the parking line recognition information comprises:
   controlling the vehicle to stop at a predetermined location;
   receiving the captured image of the target parking slot; and
   obtaining, based on the captured image, the parking line recognition information, wherein the parking line recognition information indicates at least:
   at least one entrance point of the target parking slot, and
   the plurality of parking lines of the target parking slot.

3. The method of claim 1, wherein the determining of the angular relationships between the plurality of parking lines of the target parking slot comprises:

US 12,654,689 B2

15 obtaining a first angle, relative to an entry line connecting two entrance points of the target parking slot, of a first parking line of the plurality of parking lines;

obtaining a second angle, relative to the entry line, of a second parking line of the plurality of parking lines;

determining an average angle of the first angle and the second angle;

determining, based on the first angle and the second angle, an internal angle sum; and determining, based on the average angle, a reference internal angle sum.

4. The method of claim 3, wherein the determining of the angular relationships further comprises determining whether a difference between the reference internal angle sum and 180° is less than a threshold value.

5. The method of claim 3, wherein the estimating of the gradient of the target parking slot comprises determining, based on the internal angle sum being greater than the reference internal angle sum and an absolute value of a difference between the internal angle sum and the reference internal angle sum being greater than or equal to a predetermined threshold value, that the target parking slot has a positive gradient.

6. The method of claim 3, wherein the estimating of the gradient of the target parking slot comprises determining, based on the internal angle sum being less than the reference internal angle sum and an absolute value of a difference between the internal angle sum and the reference internal angle sum being greater than or equal to a predetermined threshold value, that the target parking slot has a negative gradient.

7. The method of claim 3, wherein the estimating of the gradient of the target parking slot comprises comparing a difference, between the internal angle sum and the reference internal angle sum, to a lookup table.

8. The method of claim 1, wherein the controlling of the longitudinal driving of the vehicle comprises:

while controlling autonomous driving of the vehicle, increasing, based on the gradient of the target parking slot being positive, a target driving torque of the vehicle.

9. The method of claim 1, wherein the controlling of the longitudinal driving of the vehicle comprises:

while controlling autonomous driving of the vehicle, decreasing, based on the gradient of the target parking slot being negative, a target driving torque of the vehicle.

10. The method of claim 1, wherein the controlling of the longitudinal driving of the vehicle comprises:

while controlling autonomous driving of the vehicle, increasing, based on the gradient of the target parking slot being positive, a target braking pressure of the vehicle compared to when the gradient of the target parking slot is neutral.

11. A device comprising:

at least one processor; and a memory operatively coupled to the at least one processor, wherein the memory stores instructions that, when executed by the at least one processor, cause the device to:

obtain, from a captured image of a target parking slot, parking line recognition information;

determine, based on the parking line recognition information, angular relationships between a plurality of parking lines of the target parking slot;

16 estimate, based on the angular relationships, a gradient of the target parking slot; and control, based on the estimated gradient, longitudinal driving of a vehicle.

12. The device of claim 11, wherein the instructions, when executed by the at least one processor, cause the device to obtain the parking line recognition information by:

controlling the vehicle to stop at a predetermined location;

receiving the captured image of the target parking slot; and obtaining, based on the captured image, the parking line recognition information, wherein the parking line recognition information indicates at least:

at least one entrance point of the target parking slot, and the plurality of parking lines of the target parking slot.

13. The device of claim 11, wherein the instructions, when executed by the at least one processor, cause the device to determine the angular relationships by:

obtaining a first angle, relative to an entry line connecting two entrance points of the target parking slot, of a first parking line of the plurality of parking lines;

obtaining a second angle, relative to the entry line, of a second parking line of the plurality of parking lines;

determining an average angle of the first angle and the second angle;

determining, based on the first angle and the second angle, an internal angle sum; and determining, based on the average angle, a reference internal angle sum.

14. The device of claim 13, wherein the instructions, when executed by the at least one processor, cause the device to determine the angular relationships by:

further determining whether a difference between the reference internal angle sum and 180° is less than a threshold value.

15. The device of claim 13, wherein the instructions, when executed by the at least one processor, cause the device to estimate the gradient of the target parking slot by:

determining, based on the internal angle sum being greater than the reference internal angle sum and an absolute value of a difference between the internal angle sum and the reference internal angle sum being greater than or equal to a predetermined threshold value, that the target parking slot has a positive gradient.

16. The device of claim 13, wherein the instructions, when executed by the at least one processor, cause the device to estimate the gradient of the target parking slot by:

determining, based on the internal angle sum being less than the reference internal angle sum and an absolute value of a difference between the internal angle sum and the reference internal angle sum being greater than or equal to a predetermined threshold value, that the target parking slot has a negative gradient.

17. The device of claim 13, wherein the instructions, when executed by the at least one processor, cause the device to estimate the gradient of the target parking slot by:

comparing a difference, between the internal angle sum and the reference internal angle sum, to a lookup table.

18. The device of claim 11, wherein the instructions, when executed by the at least one processor, cause the device to control the longitudinal driving of the vehicle by:

while controlling autonomous driving of the vehicle, increasing, based on the gradient of the target parking slot being positive, a target driving torque of the vehicle.

19. The device of claim 11, wherein the instructions, when executed by the at least one processor, cause the device to control the longitudinal driving of the vehicle by:

while controlling autonomous driving of the vehicle, decreasing, based on the gradient of the target parking slot being negative, a target driving torque of the vehicle.

20. The device of claim 11, wherein the instructions, when executed by the at least one processor, cause the device to control the longitudinal driving of the vehicle by:

while controlling autonomous driving of the vehicle, increasing, based on the gradient of the target parking slot being positive, a target braking pressure of the vehicle compared to when the gradient of the target parking slot is neutral.

* * * * *